United States Patent
Gibson et al.

(10) Patent No.: US 8,285,834 B2
(45) Date of Patent: Oct. 9, 2012

(54) PACKET SNIFFER

(75) Inventors: Grant A. Gibson, Clarksville, MD (US); Kenneth G. Rubsam, Ellicott City, MD (US)

(73) Assignee: CA, Inc., Islandia, NY (US)

( * ) Notice: Subject to any disclaimer, the term of this patent is extended or adjusted under 35 U.S.C. 154(b) by 956 days.

(21) Appl. No.: 10/888,721

(22) Filed: Jul. 9, 2004

(65) Prior Publication Data

US 2005/0188081 A1 Aug. 25, 2005

Related U.S. Application Data

(60) Provisional application No. 60/486,648, filed on Jul. 11, 2003.

(51) Int. Cl.
*G06F 15/177* (2006.01)
*G06F 15/173* (2006.01)

(52) U.S. Cl. ........................................ 709/224; 709/223

(58) Field of Classification Search .................. 709/223, 709/224; 370/469
See application file for complete search history.

(56) References Cited

U.S. PATENT DOCUMENTS

| | | | | |
|---|---|---|---|---|
| 5,796,942 | A * | 8/1998 | Esbensen | 726/13 |
| 6,018,619 | A * | 1/2000 | Allard et al. | 709/224 |
| 6,026,442 | A * | 2/2000 | Lewis et al. | 709/229 |
| 7,085,683 | B2 * | 8/2006 | Anderson et al. | 702/186 |
| 7,100,020 | B1 * | 8/2006 | Brightman et al. | 712/18 |
| 7,162,507 | B2 * | 1/2007 | Carter | 709/200 |
| 7,250,944 | B2 * | 7/2007 | Anderson et al. | 345/419 |
| 7,366,101 | B1 * | 4/2008 | Varier et al. | 370/241 |
| 2002/0129138 | A1 * | 9/2002 | Carter | 709/224 |
| 2003/0217130 | A1 * | 11/2003 | Tang et al. | 709/223 |
| 2004/0034795 | A1 * | 2/2004 | Anderson et al. | 713/201 |
| 2004/0255008 | A1 * | 12/2004 | Olsen et al. | 709/220 |

* cited by examiner

*Primary Examiner* — Emmanuel L Moise
*Assistant Examiner* — Edward Kim
(74) *Attorney, Agent, or Firm* — Baker Botts L.L.P.

(57) ABSTRACT

A method for sniffing packets communicated over a network includes identifying an active protocol stack. Upon identifying an active protocol stack, a packet intercept is enabled for the identified active protocol stack. Using the packet intercept, data is then collected about the packets communicated over the network.

35 Claims, 6 Drawing Sheets

PACKET SNIFFER

REFERENCE TO RELATED APPLICATION

The present disclosure is based on and claims the benefit of Provisional Application 60/486,648 filed Jul. 11, 2003, the entire contents of which are herein incorporated by reference.

BACKGROUND

1. Technical Field

The present disclosure relates to packet sniffers and, more specifically, to TCP/IP packet sniffers.

2. Description of the Related Art

Computer networks are a critical tool for modern businesses. The success of a company can depend on the performance of the company computer network. A reliable and highly-available computer network infrastructure is needed to support access corporate data and applications running on an enterprise server connected to the computer network.

In order to assure the reliability and accessibility of the computer network, end-to-end response times and device and application response times should be known and kept within an acceptable level or end users will look to the competition for faster service.

TCP/IP network monitors such as Unicenter® NetMaster™ allow companies to monitor network performance so issues regarding reliable and high speed network access and TCP/IP access to enterprise server applications can be effectively managed and potential problems can be detected and remedied before they become critical problems.

These network monitors rely on polling such attributes as file transfer rates, the quality of TCP/IP connections to applications and response times at specific times or intervals.

However, because these network monitors poll at specific times or intervals, there may be an opportunity for potential problems to become more severe. There is therefore a need for event-driven monitoring of TCP/IP network activity so that the accuracy and effectiveness of network monitors can be improved.

SUMMARY

A method for sniffing packets communicated over a network including identifying an active protocol stack, enabling a packet intercept of identified active protocol stack, and collecting data about the packets communicated over the network using the packet intercept.

A method for sniffing packets communicated over a network including, monitoring a network using an event-driven network monitor.

A system for sniffing packets communicated over a network including an identifying unit for identifying an active protocol stack, an enabling unit for enabling a packet intercept of identified active protocol stack, and a collecting unit for collecting data about the packets communicated over the network using the packet intercept.

A system for sniffing packets communicated over a network including a monitoring unit for monitoring ring a network using an event-driven network monitor.

A computer system including a processor and, a program storage device readable by the computer system, embodying a program of instructions executable by the processor to perform method steps for sniffing packets communicated over a network, the method including identifying an active protocol stack, enabling a packet intercept of identified active protocol stack and collecting data about the packets communicated over the network using the packet intercept.

A computer system including a processor and a program storage device readable by the computer system, embodying a program of instructions executable by the processor to perform method steps for sniffing packets communicated over a network, the method including monitoring a network using an event-driven network monitor.

A computer recording medium including computer executable code for sniffing packets communicated over a network, comprising code for identifying an active protocol stack, code for enabling a packet intercept for the identified active protocol stack and code for collecting data about said packets communicated over said network using the packet intercept.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
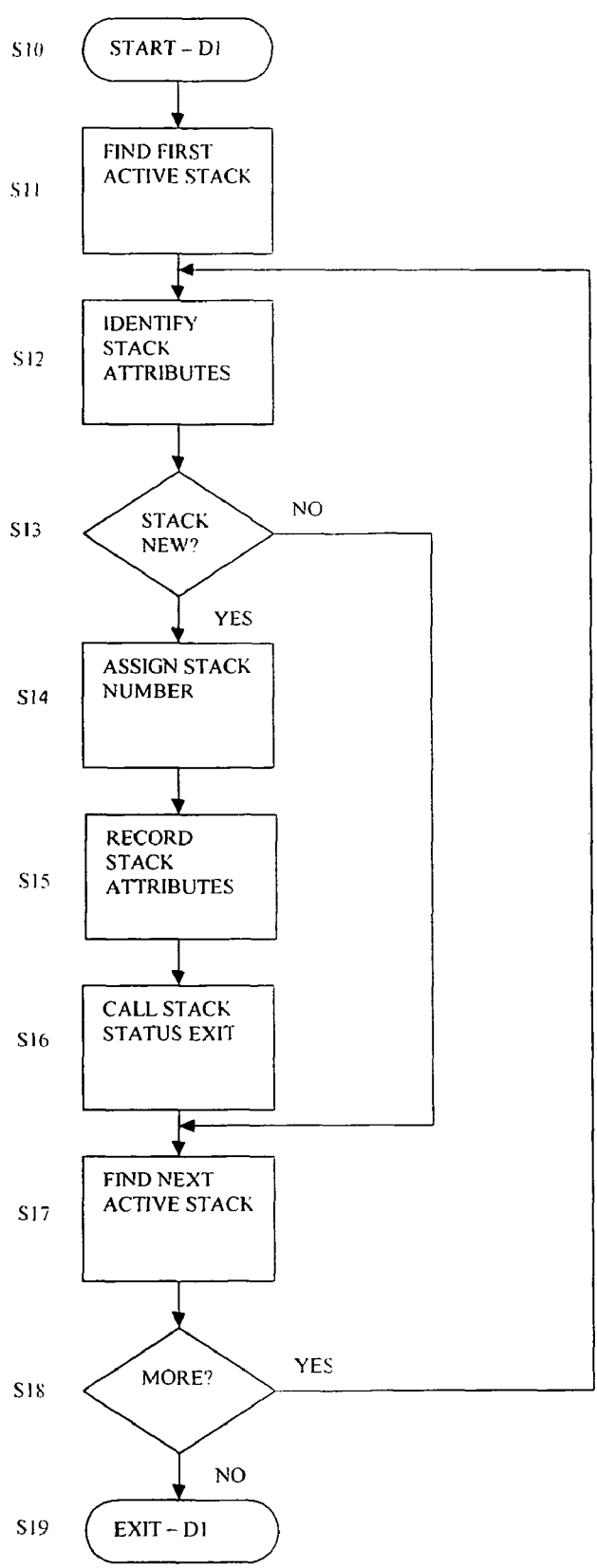
FIG. 1 shows a network monitor according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The present disclosure relates to a network monitor that can be event-driven. Whereas network monitors in the related art monitor network activity by polling the network at set times or fixed intervals, the network monitors according to embodiments of the present disclosure allow for real-time access to data flow rates on ports, connections and interfaces. The network monitor according to embodiments of the present disclosure provides access to error indications, for example the error messages and test packets generated by the internet control message protocol (ICMP). The network monitor may also provide access to indicators signifying other problems with the transmission of data across the network, for example, fragmentation and retransmission of packets, and provide access to network and application response time indicators. The network monitor according to embodiments of the present disclosure can be event-driven, monitoring information about events as they happen.

According to an embodiment of the present disclosure, event-driven network monitoring may be implemented as a stand-alone monitoring program. According to another embodiment of the present disclosure, event-driven network monitoring may be a feature that is added to a network monitoring program that monitors network attributes such as file transfer rates, the quality of TCP/IP connections to applications, etc., by polling the attributes at specific times or intervals.

Event-driven network monitoring may be implemented on any computer running any operating system. For example, event-driven network monitoring may be implemented on a server running an operating system sold under the trademark Z/OS as offered IBM®.

TCP/IP refers to a set of protocols for communicating data over a computer network. Data communicated over a network using TCP/IP protocols is generally divided into discrete data units called packets. The handling of data is generally performed by multiple network layers, each layer responsible for particular network functions, and each layer utilizing one or more protocols from the TCP/IP set of protocols. The network layers are generally hierarchical, with the top layers handling user interaction and the bottom layers handling network hardware. Each layer is dependant on the layer below it and each layer communicates with the layer above and the layer below. Because protocols are specific to the hierarchical layer in which they occur, the protocols used by the layers are generally hierarchical as well. For this reason, the TCP/IP protocols used can be referred to as the TCP/IP protocol stacks.

A network transmits data by forming a packet at the top layers using the top layer protocols and the packet is processed, for example, the packet is passed down the TCP/IP protocol stack until it reaches the bottom layer where it is then sent along the network.

The network receives data from the bottom layer and processes the packet, here passing the packet up the TCP/IP protocol stack until it reaches the top layer where it can be utilized.

According to an embodiment of the present disclosure, a network monitor may use an application program interface (API) for facilitating the utilization of the network monitor by other applications. For example, an API may be used to facilitate interaction with an event-driven network monitor of the present disclosure. Using an API allows for the separate development of stack hooks (sniffers) that are used to intercept packets to examine data that is communicated along the network and applications used to process the raw data gathered from the packets. Using an API also allows the sniffer to be developed without having to worry about other programming, for example, the sniffer's configuration, control and user interface.

FIG. 1 illustrates a network monitor according to an embodiment of the present disclosure. A process for monitoring the network begins with the terminator labeled "Start—D1." (Step S10). The network monitor identifies when a particular protocol stack, for example a TCP/IP protocol stack, is active in the processing of packets (Step S11). A protocol stack is active when it is in a state where it is capable of communicating data over a computer network. According to embodiments of the present disclosure, examining main storage control blocks of some operating systems, for example, the operating system sold under the trademark Z/OS as offered IBM®, can reveal which protocol stacks are active. Main storage control blocks may contain state information used to control the processing of packets as well as attributes that identify the protocol stack configuration. For example, the TCP/IP protocol stacks for the operating system sold under the trademark Z/OS as offered IBM® may be either the IBM Communications Server (IBM) or the protocol stacks sold under the trademark TCPaccess™ Communications Server as offered by Unicenter®. There can also be many instances of the same implementation of TCP/IP protocol stack operating on the same computer network.

The active TCP/IP protocol stack can be analyzed to identify its attributes (Step S12). Attributes can be any characteristics of the TCP/IP protocol stack that can help to distinguish the active stack being analyzed from the other stacks that may exist on the same network. For example, an attribute may be an API function code. The function code could be a character or string used to identify the stack to the API. For example, an attribute may be an API handle value. The API handle value can be a number used to determine if the API has failed in an attempt to call the stack. For example, an attribute may be the stack implementation, as in the example above, when an operating system sold under the trademark Z/OS as offered IBM® is used. The stack implementation may be either IBM that offered by IBM® or TCPACCESS as offered by Unicenter®. An attribute may be a stack name value. A stack name value can be any value that is used to name the stack. An attribute may be a memory address pointing to a memory location where information that has been returned after the stack has been used can be found.

Where the operating system sold under the trademark Z/OS as offered IBM® is used with a stack offered by IBM®, a common storage control block called the TCP/IP server anchor block (TSAB) may be examined to identify the active TCP/IP control stacks. For each active stack, the TCP/IP server data block (TSDB) and the TCP/IP server data extension (TSDX) control blocks may be examined to identify active stack's attributes.

Where the operating system sold under the trademark Z/OS as offered IBM® is used with a stack such as TCPACCESS as offered by Unicenter®, an IAB control block and the SSIT control blocks anchored within may be examined to identify active TCP/IP protocol stacks. For each active stack a SAVT control block can be examined to determine the attributes of the stack.

A determination is made whether the stack is new (Step S13). If the active stack has been identified as being a new stack (a stack that has not previously been assigned a number) (Yes, Step S13) then a stack number can be assigned to the active stack (Step S14). If the stack is identified to be a stack that has already been identified, and thus already has a stack number (No, Step S13), the next active stack can be found (Step S17). The stack number may be, for example, a 32-bit number. Any unused stack number may be assigned. For example, stack numbers may be assigned incrementally.

After a stack number has been assigned to the active stack (Step S14), the stack attributes may then be recorded along with the assigned stack number (Step S15). A monitor stack status exit may then be called. An exit is generally a routine that allows information concerning the status of the analyzed stack or packets to be passed up to the network monitor. The monitor stack status exit informs the network monitor of the instance of an activation of a new stack (Step S16).

The next active stack may then be found (Step S17) until there are no more active stacks to find (No, Step S18). When there are no more active stacks (No, Step S18) the process of searching for active stacks has completed (Step S19). When there are more active stacks (Yes, Step S18), the attributes of the next active stack are identified (Step S12) and the process repeats from that step.

According to an embodiment of the present disclosure, the network monitor may enable packet intercepts of packets traversing a computer network through one or more active stack that have been found according to the embodiment of the present disclosure described above and illustrated in FIG.

1. A packet intercept is generally a set of program logic that examines the processing of packets through the TCP/IP protocol stacks. Examination of the processing of packets through the TCP/IP protocol stacks can alert the network monitor to potential problems with the operation of the network, for example, errors with transferring packets or network slowdowns, etc. Examination of the packet processing can be achieved by dynamically inserting an element of programming called a hook into the stack. The hook may intercept each packet processed by the stack and may allow for the effective examination of the packets. After the packet intercept hook is installed, the packet intercept may gather data describing the stack and the packets that are processed by the stack. The packet intercept may generate a list of parameters describing the TCP/IP protocol stack. The packet intercept may also generate a list of parameters describing each packet that is processed by the stack. The parameter lists may include pertinent information, for example, it may include a 32-bit stack number, an address of related interface name, an indication of whether the packet is an inbound or outbound packet, a total length of the packet, and the address of a packet segment table, packet data, packet header information, information about the physical interface the packet is transmitted over, the speed of packet transmission, packet transmission errors, addresses where the packet resides, access-list entry tokens, a length of a segment of the packet, etc. The packet segment table may be a table containing the addresses of where the packet segments reside in main storage, tokens identifying the region of main storage in which the packet segments reside, lengths of the packet segments in main storage, etc. This data can then be shared with the network monitor by launching a packet intercept exit routine, thereby providing the network monitor access to each packet input to and output from a given TCP/IP protocol stack. The packet intercept exit routine may copy part or all of the packet data. For example, the packet intercept exit routine may collect packet header information. The packet intercept exit routine may also collect, for example, information about the speed of packet transmission, packet transmission errors and information about which physical interface data is transmitted over. When examination of the packet has completed, the packet intercept may relinquish control by branching to the program logic of the TCP/IP protocol stack as if no examination had occurred.

Figure 2:
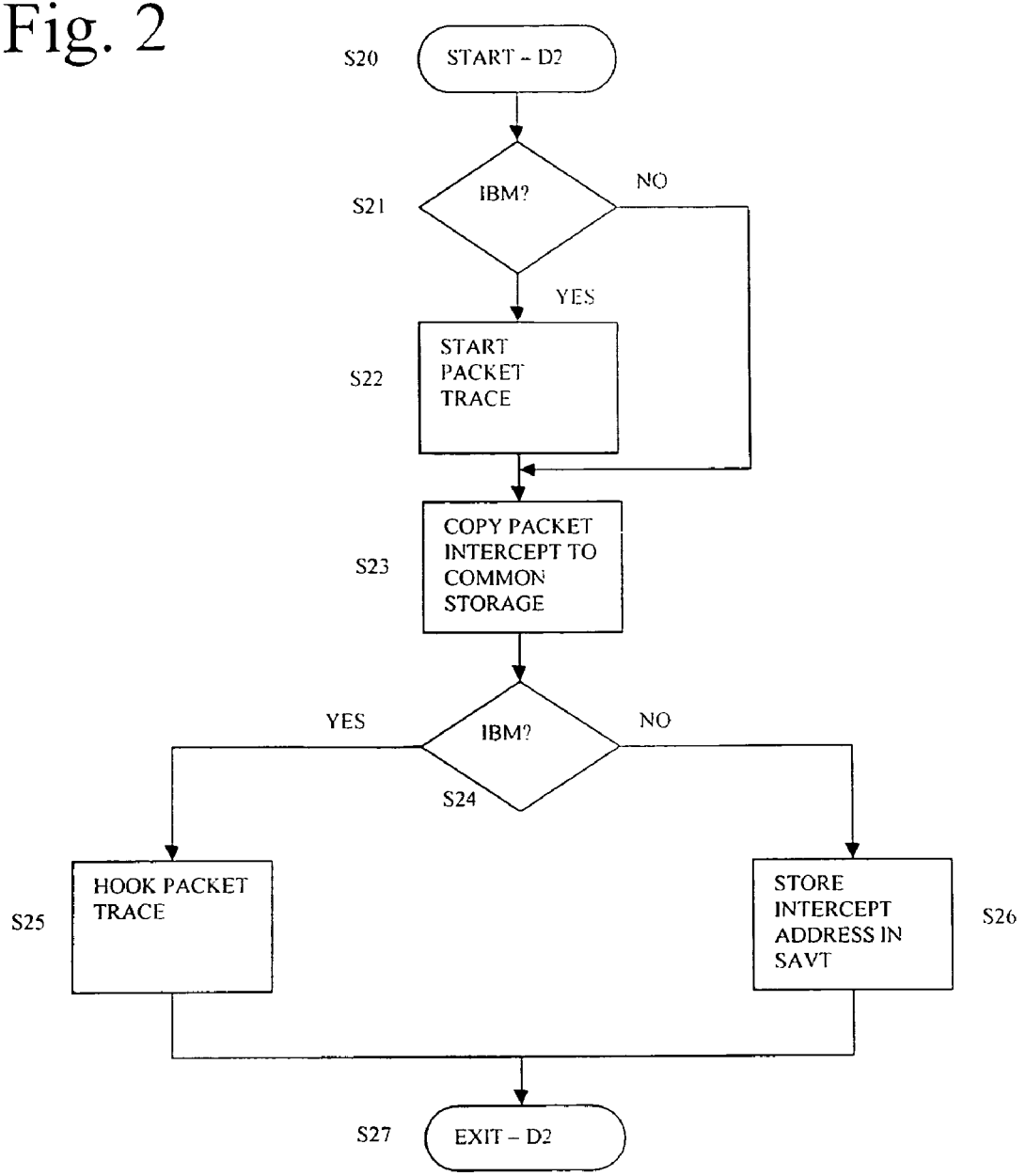
FIG. 2 shows an example of enabling packet intercepts according to an embodiment of the present disclosure.

An example of enabling packet intercepts according to an embodiment of the present disclosure is depicted in FIG. 2. This example is based on an embodiment of the present disclosure running on an operating system sold under the trademark Z/OS as offered IBM®. This flow chart begins with the terminator marked Start—D2 (Step S20). It is generally first determined whether an active stack is a stack offered by IBM® (Step S21) and therefore not a stack such as TCPACCESS as offered by Unicenter®. If the stack is a stack offered by IBM® (Yes, Step S21) then a trace of the packets through the stack may be initiated (Step S22). If the stack is not a stack offered by IBM® (No, Step S21), and is therefore a stack such as TCPACCESS as offered by Unicenter®, then the step of tracing the stack (Step S22) may be skipped. The trace allows the navigation of the packet to be observed. Next, storage for the packet intercept program logic can be allocated from the operating system common storage area (CSA) and the storage area can be initialized with the packet intercept program logic (Step S23). If the stack is a stack offered by IBM® (Yes, Step S24), then the packet intercept hook can be installed into the stack (Step S25). If the stack is not an IBM stack a stack offered by IBM® (No, Step S24) and is therefore a stack such as TCPACCESS as offered by Unicenter®, then the hook can be installed by storing the intercept address in the allocated region of the CSA (Step S26). The flow chart ends with the terminator marked EXIT—D2 (Step S27).

Figure 3:
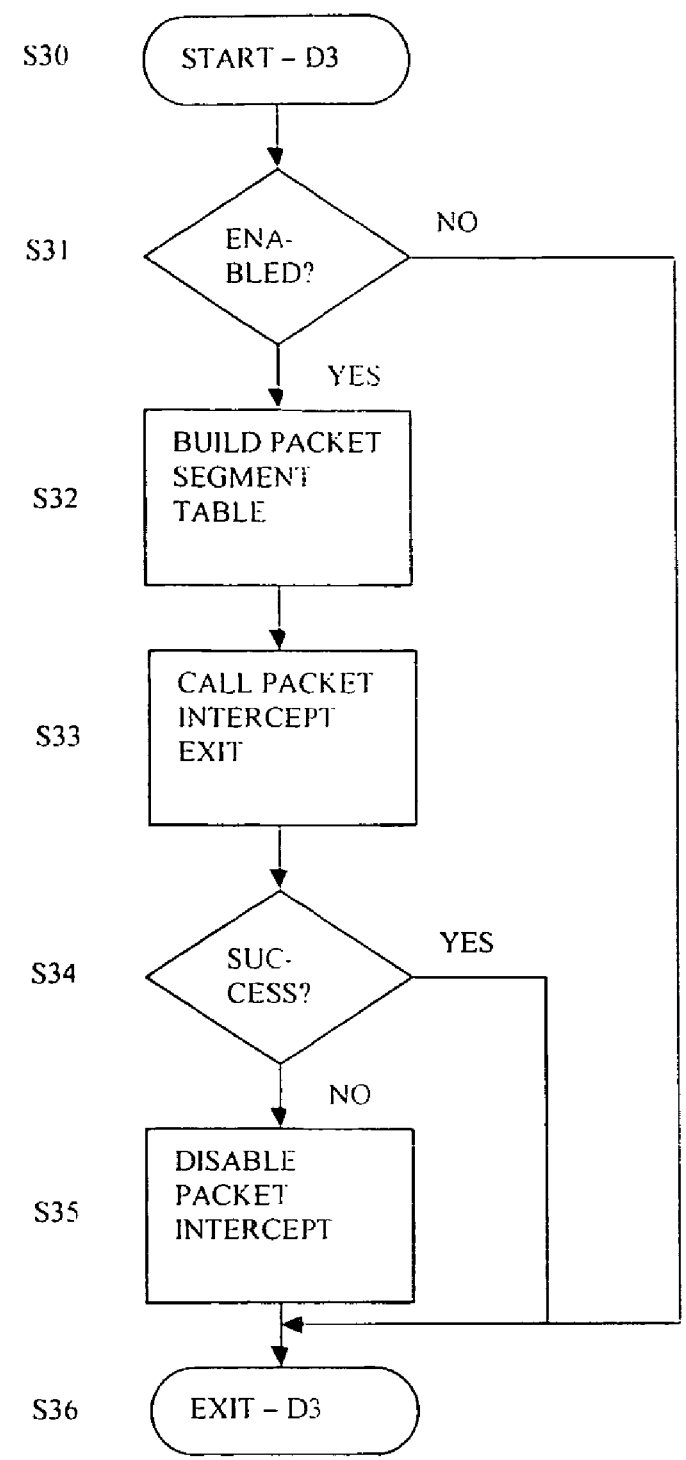
FIG. 3 shows a process performed by the packet intercept program logic according to an embodiment of the present disclosure.

The processing performed by the packet intercept program logic is illustrated in FIG. 3. This flow chart begins with the terminator marked Start—D3 (Step S30). It can first be determined whether the packet intercept is enabled (Step S31). If the packet intercept is not enabled (No, Step S31) then no additional action need be taken (Step S36) and the normal transmission of packets across the TCP/IP protocol stack may be permitted. Otherwise (Yes, Step S31) a packet segment table can be created (Step S32). The packet segment table is generally a listing of the addresses of each segment of each packet. The network monitor packet intercept exit routine can be called (Step S33). This allows the packet segment table to be sent to the network monitor. If the exit fails (No. Step S34) then the packet intercept can be disabled (Step S35) and the exit will not be called again. The flow chart ends with the terminator marked EXIT—D3 (Step S36).

Figure 4:
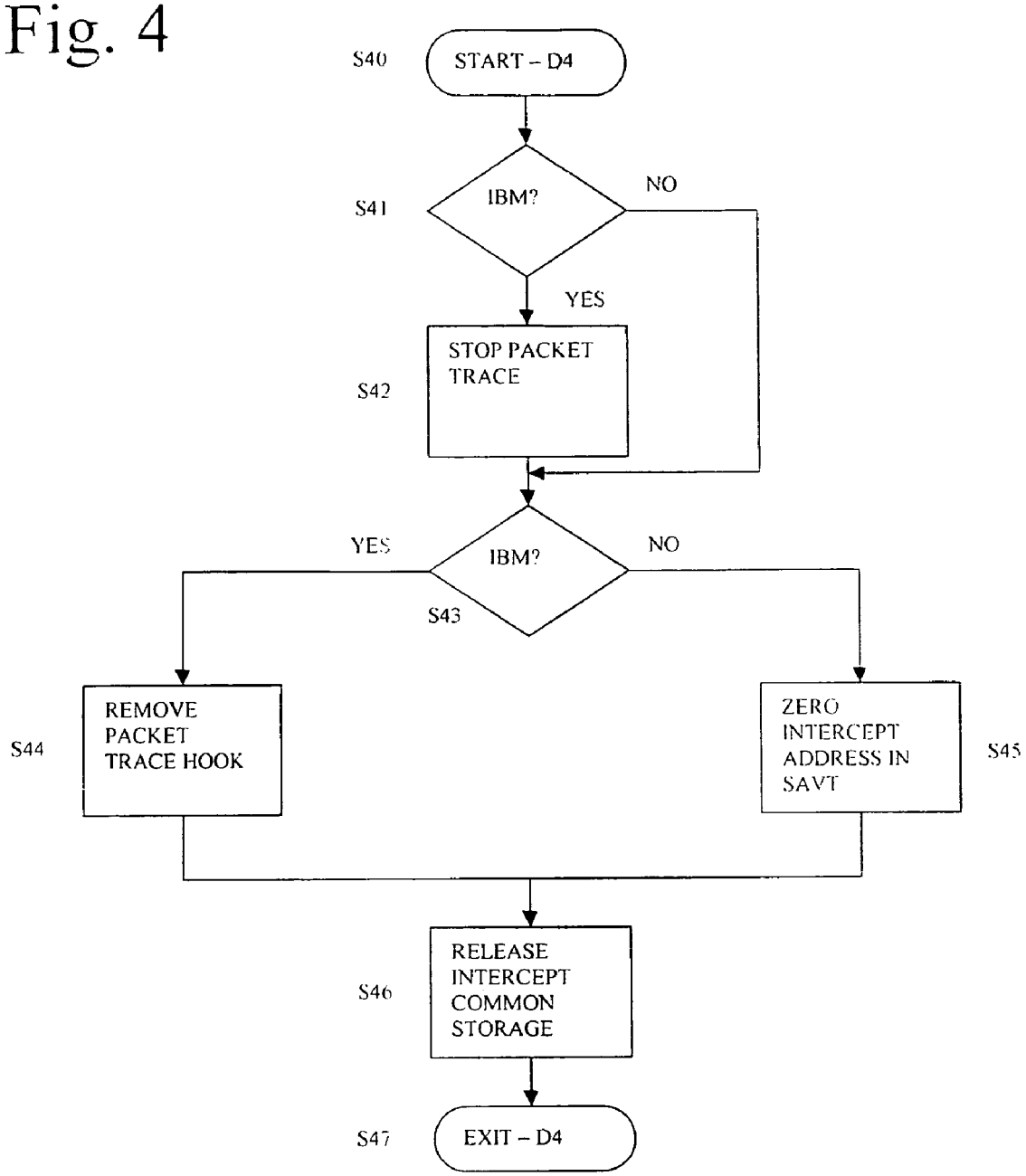
FIG. 4 shows a process of disabling a packet intercept according to an embodiment of the present disclosure.

As described above, packet intercepts may relinquish control when the examination has completed. Under these circumstances, the hook usually remains installed so that subsequent packets can be intercepted. The hook may be removed when the launching of the network monitor packet intercept exit routine fails. When this event occurs, the packet intercept may detect the failure in the exit routine (No, Step S34) and remove the hook before relinquishing control. The hook may also be removed when the network monitor requests that packet intercepts be disabled. An example of the process of disabling a packet intercept is illustrated in FIG. 4. This example is based on an embodiment of the present disclosure running on an operating system sold under the trademark Z/OS as offered IBM®. This flow chart begins with the terminator marked Start—D4 (step S40). It may first be determined whether an active stack is a stack offered by IBM® (Step S41) and therefore not a stack such as TCPACCESS as offered by Unicenter®. If the stack is a stack offered by IBM® (Yes, Step S41) then packet trace of the packets through the stack can be stopped (Step S42). If the stack is not a stack offered by IBM® (No, Step S41), and is therefore a stack such as TCPACCESS as offered by Unicenter®, then the step of stopping the trace (Step S42) may be skipped. If the stack is a stack offered by IBM® (Yes, Step S43), then the packet intercept hook can be removed (Step S44). If the stack is not a stack offered by IBM® (No, Step S43) and is therefore a stack such as TCPACCESS as offered by Unicenter®, then the hook can be removed by setting to zero the intercept address in the CSA (Step S45). Finally, the storage allocated for the packet intercept program logic from the operating system CSA can be released (Step S46). The flow chart ends with the terminator marked EXIT—D4 (Step S47).

Figure 5:
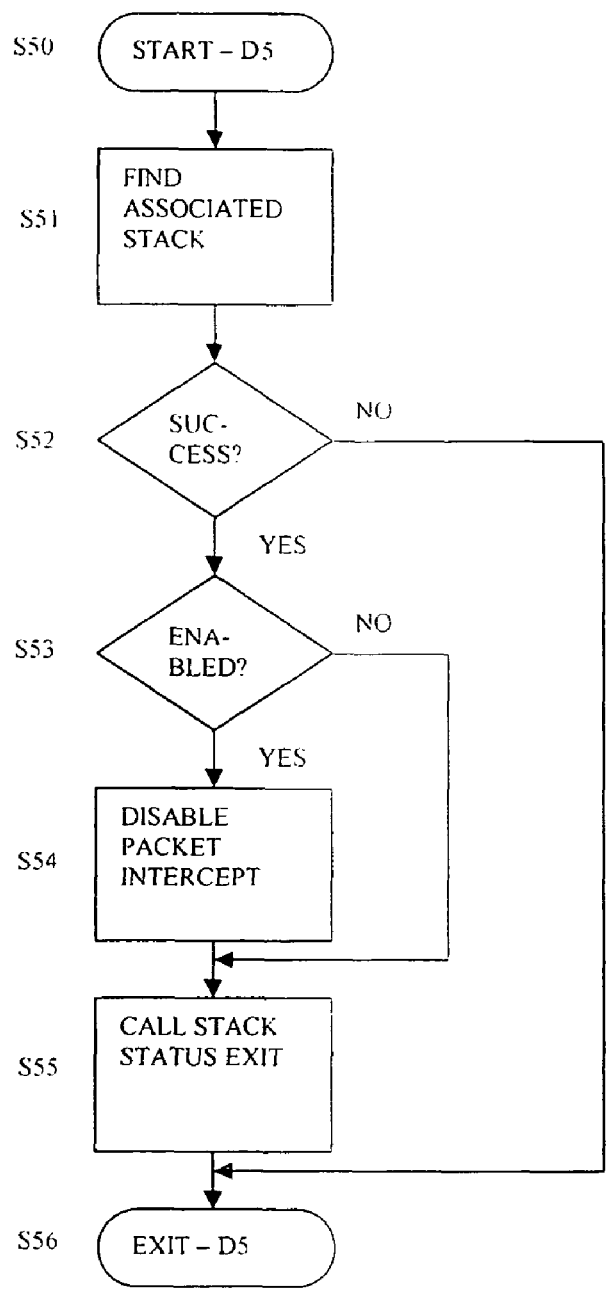
FIG. 5 shows an example of detecting the termination of an active TCP/IP protocol stack an embodiment of the present disclosure.

Embodiments of the present disclosure may use operating system exits to detect the termination of an active TCP/IP protocol stack. An active TCP/IP protocol stack is terminated when the communication of packets across that stack have ended. Termination of the active TCP/IP protocol stack is significant because it allows the network monitor to discontinue monitoring the TCP/IP protocol stack unless and until the stack is reactivated. An example of detecting the termination of an active TCP/IP protocol stack is illustrated in FIG. 5. This flow chart begins with the terminator marked Start—D5 (Step S50). When a process terminates the operating system exit may attempt to find a stack associated with the termination process (Step S51). If one is found (Yes Step S52) then the operating system exit attempts to find enabled packet intercepts associated with the stack (Step S53). If no stack associated with the detected terminating unit of work is found (No, Step S52) then the process of detecting a termination ends (Step S56). If enabled packet intercepts associated with the stack are found (Yes. Step S53) then the packet intercepts are disabled (Step S54). Then the network monitor stack status exit can be called to inform the network monitor that the stack instance has terminated (Step S55). If no enabled packet intercepts associated with the stack are found (No, Step S53), then the monitor stack status exit can be called (Step S55) without attempting to disable packet intercepts (Step S54). The flow chart ends with the terminator marked EXIT—D5 (Step S56).

Figure 6:
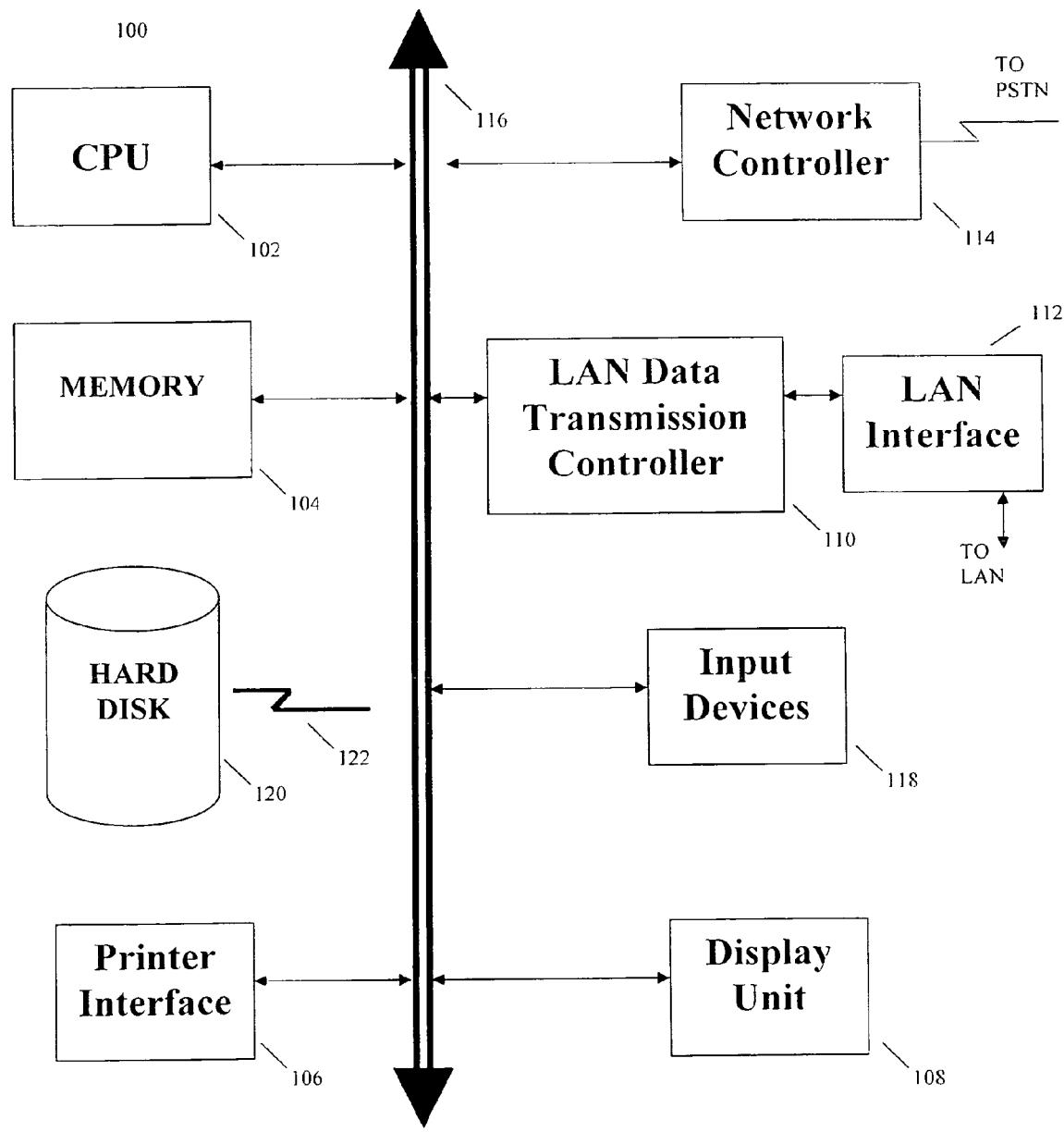
FIG. 6 shows an example of a computer system capable of implementing the method and apparatus of the present disclosure.

FIG. 6 shows an example of a computer which may implement the methods and systems of the present disclosure. The systems and methods of the present disclosure may be implemented in the form of one or more software applications running on one or more computer systems for example, a mainframe, personal computer (PC), handheld computer, server, gateway etc. The software applications may be stored on recording media locally accessible by the computer systems, for example, floppy disk, compact disc, hard disk, etc., or may be remote from the computer systems and accessible via a hard wired or wireless connection to a network, for example, a local area network or the Internet.

The computer referred to generally as system 100 may include a central processing unit (CPU) 102, memory 104, for example, Random Access Memory (RAM) a printer interface 106, a display unit 108, a (LAN) local area network data transmission controller 110, a LAN interface 112, a network controller 114, an internal bus 116 and one or more input devices 118, for example, a keyboard, mouse etc. As shown the system 100 may be connected to a data storage device, for example, a hard disk, 120 via a link 122.

Numerous additional modifications and variations of the present disclosure are possible in view of the above-teachings. It can therefore be understood that within the scope of the appended claims, the present disclosure may be practiced other than as specifically described herein.

What is claimed is:

1. A method for sniffing packets communicated over a network, the method comprising:
    examining state information stored in at least one main storage control block of an operating system to identify an active protocol stack within a plurality of protocol stacks on the network, the active protocol stack actively being used to communicate a packet over the network;
    analyzing the protocol stack to identify at least one attribute of the active protocol stack, the at least one attribute identifying one of a plurality of protocol stack configurations present on the network and distinguishing the active protocol stack from at least one other protocol stack on the network that is not being used to actively communicate a packet over the network;
    enabling a packet intercept for the identified active protocol stack based on the identified protocol stack configuration;
    collecting data about said packets communicated over said network using said packet intercept;
    using an operating system exit to detect the termination of the active protocol stack when the communication of packets across the active protocol stack have been ended, wherein detecting the termination of the protocol stack comprises:
        detecting a termination process from the active protocol stack; and
        determining that the protocol stack includes an enabled packet intercept; and
        in response to detecting that the active protocol stack is no longer in a state where it is capable of communicating packets over the network, removing the packet intercept from the active protocol stack.

2. The method for sniffing packets communicated over a network according to claim 1, wherein said data about said packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

3. The method for sniffing packets communicated over a network according to claim 1, wherein said packet intercept collects data by inserting a hook into said protocol stack.

4. The method for sniffing packets communicated over a network according to claim 1, wherein said active protocol stack is an active TCP/IP protocol stack.

5. A system for sniffing packets communicated over a network comprising:
    at least one processor operable to execute an identifying unit for examining state information stored in at least one main storage control block of an operating system to identify an active protocol stack within a plurality of protocol stacks on the network, the active protocol stack actively being used to communicate a packet over the network, the identifying unit further operable to identify at least one attribute of the active protocol stack, the at least one attribute identifying one of a plurality of protocol stack configurations present on the network and distinguishing the active protocol stack from at least one other protocol stack on the network that is not being used to actively communicate a packet over the network;
    the at least one processor operable to execute an enabling unit for enabling a packet intercept for the identified active protocol stack based on the identified protocol stack configuration;
    the at least one processor operable to execute a collecting unit for collecting data about said packets communicated over said network using said packet intercept;
    wherein the enabling unit:
        uses an operating system exit to detect the termination of the active protocol stack when the communication of packets across the active protocol stack have been ended, wherein detecting the termination of the protocol stack comprises:
        detecting a termination process from the active protocol stack; and
        determining that the protocol stack includes an enabled packet intercept; and
        in response to detecting that the active protocol stack is no longer in a state where it is capable of communicating packets over the network, removing the packet intercept from the active protocol stack.

6. The system for sniffing packets communicated over a network according to claim 5, wherein said data about said packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

7. The system for sniffing packets communicated over a network according to claim 5, wherein said packet intercept collects data by inserting a hook into said protocol stack.

8. The system for sniffing packets communicated over a network according to claim 5, wherein said active protocol stack is an active TCP/IP protocol stack.

9. A computer system comprising:
- a processor; and
- a program storage device readable by the processor, embodying a program of computer executable code for sniffing packets communicated over a network, the code comprising:
- code for examining state information stored in at least one main storage control block of an operating system to identify an active protocol stack protocol stack within a plurality of protocol stacks on the network, the active protocol stack actively being used to communicate a packet over the network;
- code for analyzing the protocol stack to identify at least one attribute of the protocol stack, the at least one attribute identifying one of a plurality of protocol stack configurations present on the network and distinguishing the active protocol stack from at least one other protocol stack on the network that is not being used to actively communicate a packet over the network;
- code for enabling a packet intercept for the identified active protocol stack based on the identified protocol stack configuration;
- code for collecting data about said packets communicated over said network using said packet intercept;
- code for using an operating system exit to detect the termination of the active protocol stack when the communication of packets across the active protocol stack have been ended, wherein detecting the termination of the protocol stack comprises:
  - detecting a termination process from the active protocol stack; and
  - determining that the protocol stack includes an enabled packet intercept; and
- code for removing the packet intercept from the active protocol stack in response to detecting that the active protocol stack is no longer in a state where it is capable of communicating packets over the network.

10. The computer system according to claim 9, wherein said data about said packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

11. The computer system according to claim 9, wherein said packet intercept collects data by inserting a hook into said protocol stack.

12. The computer system according to claim 9, wherein said active protocol stack is an active TCP/IP protocol stack.

13. The computer system according to claim 9, wherein said computer system is a server running IBM® z/OS operating system.

14. A non-transitory computer recording medium including computer executable code for sniffing packets communicated over a network, comprising:
- code for examining state information stored in at least one main storage control block of an operating system to identify an active protocol stack within a plurality of protocol stacks on the network, the active protocol stack actively being used to communicate a packet through the network;
- code for analyzing the protocol stack to identify at least one attribute of the protocol stack, the at least one attribute identifying one of a plurality of protocol stack configurations present on the network and distinguishing the active protocol stack from at least one other protocol stack on the network that is not being used to actively communicate a packet over the network;
- code for enabling a packet intercept for the identified active protocol stack based on the protocol stack configuration;
- code for collecting data about said packets communicated over said network using said packet intercept;
- code for using an operating system exit to detect the termination of the active protocol stack when the communication of packets across the active protocol stack have been ended, wherein detecting the termination of the protocol stack comprises:
  - detecting a termination process from the active protocol stack; and
  - determining that the protocol stack includes an enabled packet intercept; and
- code for removing the packet intercept from the active protocol stack in response to detecting that the active protocol stack is no longer in a state where it is capable of communicating packets over the network.

15. The non-transitory computer recording medium for sniffing packets communicated over a network according to claim 14, wherein said data about said packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

16. The non-transitory computer recording medium for sniffing packets communicated over a network according to claim 14, wherein said packet intercept collects data by inserting a hook into said protocol stack.

17. The non-transitory computer recording medium for sniffing packets communicated over a network according to claim 14, wherein said active protocol stack is an active TCP/IP protocol stack.

18. A method for sniffing packets communicated over a network, the method comprising:
- examining state information to examine state information stored in at least one main storage control block of an operating system to identify an active TCP/IP protocol stack, the active TCP/IP protocol stack within a plurality of protocol stacks on the network, the active protocol stack in a state actively communicating data;
- analyzing the protocol stack to identify at least one attribute of the active TCP/IP protocol stack, the at least one attribute identifying one of a plurality of protocol stack configurations within TCP/IP and distinguishing the active TCP/IP protocol stack from at least one other protocol stack on the network that is not being used to actively communicate a packet over the network;
- enabling a packet intercept for the identified active TCP/IP protocol stack based on the identified protocol stack configuration;
- collecting data about the packets communicated over the network using the packet intercept;
- using an operating system exit to detect the termination of the active TCP/IP protocol stack when the communication of packets across the active TCP/IP protocol stack have been ended, wherein detecting the termination of the protocol stack comprises:

detecting a termination process from the active protocol stack; and determining that the protocol stack includes an enabled packet intercept; and in response to detecting that the active TCP/IP protocol stack is no longer in a state where it is capable of communicating packets over the network, removing the packet intercept from the active TCP/IP protocol stack.

19. The method for sniffing packets communicated over a network according to claim 18, wherein examining the state information comprises examining a main storage control block of an operating system that maintains state information used to control the processing of packets.

20. The method for sniffing packets communicated over a network according to claim 18, wherein the data collected about the packets comprises a file transfer rate or a response time.

21. The method for sniffing packets communicated over a network according to claim 18, wherein the data collected about the packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

22. The method for sniffing packets communicated over a network according to claim 18, wherein the packet intercept collects data by inserting a hook into the TCP/IP protocol stack.

23. A system for sniffing packets communicated over a network comprising:

at least one processor operable to execute an identifying unit for examining state information to stored in at least one main storage control block of an operating system to identify an active TCP/IP protocol stack and analyzing the protocol stack to identify at least one attribute of the protocol stack, the active TCP/IP protocol stack comprising one of a plurality of protocol stacks on the network, the at least one attribute identifying one of a plurality of TCP/IP protocol stack configurations within TCP/IP and distinguishing the active TCP/IP protocol stack from at least one other protocol stack on the network that is not being used to actively communicate a packet over the network;

the at least one processor operable to execute an enabling unit for enabling a packet intercept for the identified active protocol stack based on the protocol stack configuration;

the at least one processor operable to execute a collecting unit for collecting data about the packets communicated over the network using the packet intercept;

wherein the enabling unit is further for:

using an operating system exit to detect the termination of the active TCP/IP protocol stack when the communication of packets across the active TCP/IP protocol stack have been ended, wherein detecting the termination of the protocol stack comprises:

detecting a termination process from the active protocol stack; and determining that the protocol stack includes an enabled packet intercept; and in response to detecting that the active TCP/IP protocol stack is no longer in a state where it is capable of communicating packets over the network, removing the packet intercept from the active TCP/IP protocol stack.

24. The system for sniffing packets communicated over a network according to claim 23, wherein the identifying unit is operable to examine the state information by examining a main storage control block of an operating system that maintains state information used to control the processing of packets.

25. The system for sniffing packets communicated over a network according to claim 23, wherein the data collected about the packets comprises a file transfer rate or a response time.

26. The system for sniffing packets communicated over a network according to claim 23, wherein the data collected about the packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

27. The system for sniffing packets communicated over a network according to claim 23, wherein the enabling unit enables the packet intercept by inserting a hook into the TCP/IP protocol stack.

28. A non-transitory computer recording medium including computer executable code for sniffing packets communicated over a network, comprising:

code for examining state information stored in at least one main storage control block of an operating system to identify an active TCP/IP protocol stack, the active TCP/IP protocol stack within a plurality of protocol stacks on the network, the active TCP/IP protocol stack in a state actively communicating data;

code for analyzing the protocol stack to identify at least one attribute of the protocol stack, the at least one attribute identifying one of a plurality of TCP/IP protocol stack configurations within TCP/IP and distinguishing the active TCP/IP protocol stack from at least one other protocol stack on the network that is not being used to actively communicate a packet over the network;

code for enabling a packet intercept for the identified active TCP/IP protocol stack based on the protocol stack configuration;

code for collecting data about the packets communicated over the network using the packet intercept;

code for using an operating system exit to detect the termination of the active TCP/IP protocol stack when the communication of packets across the active TCP/IP protocol stack have been ended, wherein detecting the termination of the protocol stack comprises:

detecting a termination process from the active protocol stack; and determining that the protocol stack includes an enabled packet intercept; and code for removing the packet intercept from the active TCP/IP protocol stack in response to detecting that the active TCP/IP protocol stack is no longer in a state where it is capable of communicating packets over the network.

29. The non-transitory computer recording medium for sniffing packets communicated over a network according to claim 28, wherein examining the state information comprises examining a main storage control block of an operating system that maintains state information used to control the processing of packets.

30. The computer recording medium for sniffing packets communicated over a network according to claim 28, wherein the data collected about the packets comprises a file transfer rate or a response time.

31. The non-transitory computer recording medium for sniffing packets communicated over a network according to claim 28, wherein the data collected about the packets includes at least one of: stack number, address of related interface name, indication of whether packet is inbound or outbound, packet length, address of packet segment table, packet data, packet header information, packet physical interface information, speed of packet transmission, packet transmission errors, address where the packet resides, access-list entry tokens, length of a segment of the packet.

32. The non-transitory computer recording medium for sniffing packets communicated over a network according to claim 28, wherein the packet intercept collects data by inserting a hook into the TCP/IP protocol stack.

33. The method of claim 1, wherein removing the packet intercept from the active protocol stack comprises discontinuing monitoring of the active protocol stack unless and until the active protocol stack is reactivated.

34. The method of claim 1, wherein analyzing the protocol stack to identify the at least one attribute comprises:
　　determining whether the active protocol stack is a new protocol stack or a previously identified protocol stack;
　　assigning a stack number to the active protocol stack if it is a new protocol stack; and
　　identifying a previously assigned stack number if the active protocol stack is a previously identified protocol stack.

35. The method of claim 1, further comprising informing a network monitor that the active protocol stack is no longer active.

\* \* \* \* \*